United States Patent [19]
Itoh et al.

[11] 3,868,317
[45] Feb. 25, 1975

[54] PROCESS FOR CONVERSION OF HYDROCARBONS

[75] Inventors: Takuji Itoh; Ikuo Akitsuki; Tadashi Miura, all of Ohi-Machi; Kohei Kubota, Kasukabe, all of Japan

[73] Assignee: Toa Nenryo Kogyo Kabushiki Kaisha

[22] Filed: Jan. 31, 1973

[21] Appl. No.: 328,847

[30] Foreign Application Priority Data
Feb. 5, 1972 Japan................................. 47-13024

[52] U.S. Cl................................. 208/139, 252/441
[51] Int. Cl............................................. C10g 35/06
[58] Field of Search....... 208/138, 139; 252/466 PT, 252/441, 442, 470

[56] References Cited
UNITED STATES PATENTS

| | | | |
|---|---|---|---|
| 2,662,861 | 12/1953 | Riblett et al. | 252/466 PT |
| 2,814,599 | 11/1957 | Lefrancors et al. | 208/138 |
| 2,888,397 | 5/1959 | Burton et al. | 252/466 PT |
| 3,745,112 | 7/1973 | Ransch | 208/139 |
| 3,755,198 | 8/1973 | Stratenns | 252/466 PT |

*Primary Examiner*—Delbert E. Gantz
*Assistant Examiner*—James W. Hellwege
*Attorney, Agent, or Firm*—Arnold D. Litt; Edward M. Corcoran

[57] ABSTRACT

The invention relates to a hydrocarbon conversion catalyst and process for making same. The catalyst comprises a refractory oxide as a carrier, between about 0.01 and 6% by weight of a Group VIII metal, between about 0.01 and 6% by weight of cadmium, between about 0.01 and 6%, by weight of tin and between about 0.1 and 5% by weight of a halogen (each per cent being based on the total catalyst).

The catalyst has particular applicability to reforming processes.

3 Claims, 1 Drawing Figure

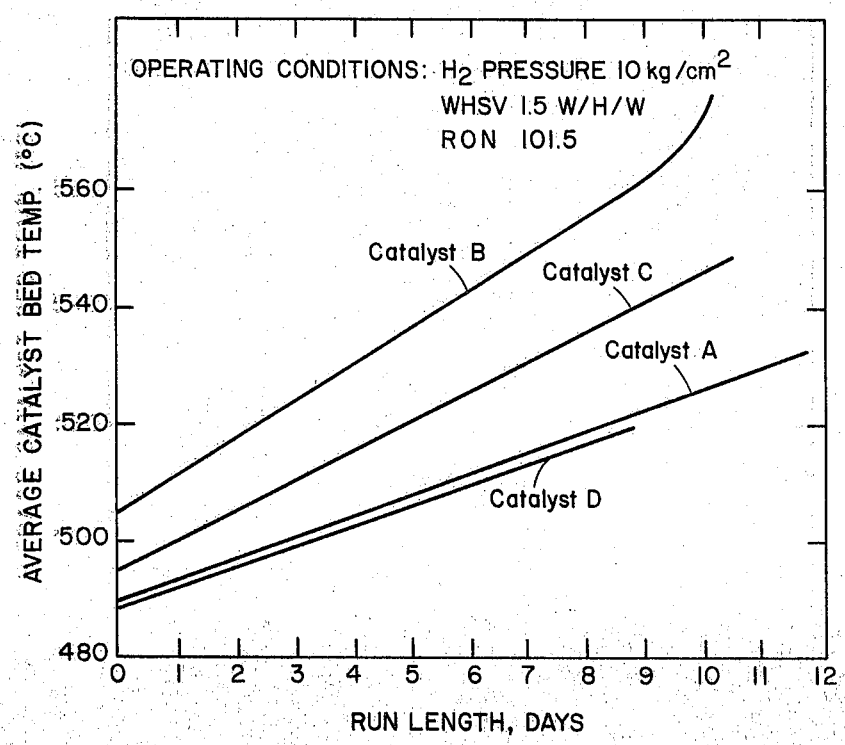

PROCESS FOR CONVERSION OF HYDROCARBONS

BACKGROUND OF THE INVENTION

1. Field of the Invention

This invention relates to a catalyst for conversion of hydrocarbons, especially a catalyst for reforming of hydrocarbons, and to a reaction for conversion of hydrocarbons in the presence of such catalyst composition. More specifically, the invention relates to a process for the catalytic reforming of hydrocarbons in the presence of hydrogen and to a catalyst composition suitable for said catalytic reforming.

2. Description of the Prior Art

Various methods for conversion of hydrocarbons in the presence of hydrogen, such as hydrogenation, isomerization, alkylation, hydrodesulfurization and hydrocracking, are very important in the petroleum refining industry as means for improving quality of hydrocarbons and heightening their utility. Hydrocarbon reforming in the presence of a solid catalyst is especially broadly utilized in the petroleum refining industry, and is adopted for obtaining materials of a high octane number by employing as raw material naphtha fractions separated from crude oil or for providing solvents or raw materials rich in aromatic components to be used in the petrochemical industries. Catalytic reforming is effected by employing a solid catalyst containing a dehydrogenating active metal component and an isomerizing active metal component, and the term "catalytic reforming" generally refers to a complex reaction including the dehydrogenation of naphthenes, dehydrocyclization of paraffins, isomerization of paraffins, hydrocarcking of napthenes and paraffins, etc. In general, the catalytic reforming is industrially utilized in the fixed bed read process using a solid catalyst.

Recently, the importance of the catalytic reforming process has been increased especially in the petroleum refining industry due to the necessity of providing lead-free or low-leaded gasolines. In order to obtain gasoline of a high octane number from naphtha of a low octane number in good yield, use of a catalyst which exhibits good selectivity to said reaction and endures a long-time continuous operation with low reduction rate of the activity, i.e., reasonably high stability, is necessary.

A catalyst comprising platinum supported on an alumina carrier has been used broadly in the catalytic reforming process. Such platinum catalyst exhibits high dehydrogenating activity and high dehydrocyclizing activity and is excellent as a reforming catalyst. However, since platinum is expensive, from an economic viewpoint, efforts must be made to minimize the amount of platinum used. Another problem to be considered as regards platinum catalysts now used industrially is that although the initial catalyst activity is high, because platinum exhibits good dispersibility when supported on a carrier, coagulation of platinum particles occurs as the operation time is prolonged, resulting in reduction of catalyst activity.

From the foregoing, not only a high initial activity relative to a specific reaction, but also an ability to maintain high activity for a long period of time is required of the hydrocarbon conversion catalyst. Thus, for example, with regard to reforming catalysts, it is desirable not only that they exhibit high selectivity relative to gasoline forming reactions characterized by product of high octane number and high yield at relatively low temperatures, but that they display good activity maintenance over a relatively long period of time.

Accordingly, proposals have heretofore been made to add a halogen compound to the reaction zone during operation for maintaining a good dispersion state of platinum, or to improve the activity and activity-maintenance by treating a deactivated catalyst in the presence of a halogen compound and thus re-dispersing platinum.

Recently, a catalyst comprising platinum-rhenium supported on alumina was proposed as a catalyst having a low rate of activity degradation i.e., an improved stability (see, for instance, British Pat. No. 1,151,639). It is reported that when sufficient care is paid to the catalyst preparation method and the method of using it, this catalyst of the platinum-rhenium type exhibits a higher activity-maintenance than that of conventional platinum catalysts and it can be used under operation conditions of low hydrogen pressure. However, the main problem of this catalyst is that the production of rhenium is much smaller than the requirement for the reforming catalyst demanded in the petroleum-refining industry. Thus, such catalyst is disadvantageous in the reforming process conducted continuously for a long time on an industrial scale.

Again, a reforming process employing a catalyst comprising as an active metal component a solid solution of germanium and platinum or palladium (Japanese Patent Publication No. 6777/61) or a reforming process employing a catalyst of the rhenium-tin-platinum type (Japanese Patent Laid-Open No. 706/71) has been proposed. Still further, U.S. Pat. No. 3,692,701 discloses a catalyst composition useful for dehydrogenation of organic feedstocks, the catalyst comprising at least one Group VIII metal (0.1–5 wt. percent based on total catalyst), tin (0.01–5 wt. percent based on total catalyst) and Group IA and IIA activating components. Still further, U.S. Pat. No. 2,777,805 teaches a catalyst composition comprising a refractory oxide carrier such as silica, alumina or the like in combination with 0.01–5% Group VIII metal such as platinum, 0.01 to 10% cadmium, zinc or mercury and 0.1–10% of a halogen. Other related processes disclosed in the art include that taught in Belgian Pat. No. 781,855, issued Apr. 7, 1972. However, these processes are not satisfactory either in the cost of the starting material of the catalyst or in the effect attained by the catalyst, and, hence, their industrial value is low.

SUMMARY OF THE INVENTION

This invention relates to a catalyst composition for conversion of hydrocarbons, which is characterized in that it comprises a refractory oxide as a carrier and 0.01 to 6 percent by weight of a metal of the platinum group, 0.01 to 6 percent by weight of cadmium, 0.01 to 6 percent by weight of tin and 0.1 to 5 percent by weight of a halogen, each percent being based on the total catalyst.

Further, this invention relates to a process for the conversion of hydrocarbons, characterized by reacting a hydrocarbon with hydrogen in the presence of a catalyst composition comprising a refractory oxide as a carrier and a metal of the platinum group, cadmium, tin and a halogen, especially to such process characterized by contacting a naphtha fraction with hydrogen under reforming conditions in the presence of the above catalyst compositions.

Any kind of refractory oxide may be used as a carrier in this invention. Porous solid carriers such as alumina, bentonite, clay, diatomaceous earth, zeolite, silica, magnesia, zirconia, thoria, etc. may be used conveniently. These carriers may be used singly or in the form of admixtures of two or more of them. Active carbon is also usable as a carrier. It is preferred that such carrier has a surface area of more than about 50 $m^2/g$, especially more than about 100 $m^2/g$. In the catalytic reforming, a porous solid having a low cracking activity, such as alumina, e.g., alpha alumina and gamma alumina, or magnesia is especially preferred. In other hydrocarbon conversions, e.g., hydrocracking, use of crystalline zeolite having a high cracking activity is preferred. Suitable combinations of carriers such as silica-alumina, silica-magnesia, silica-alumina-magnesia and silica-zirconia may be chosen and used appropriately. A carrier comprising about 10 to 50 percent by weight of silica is preferably used, in hydrocracking reactions such as for the production of lubricant fractions. In the production of gasolines, use of a silica-alumina carrier comprising about 30 to 99 percent by weight of silica is preferred.

Alumina prepared by conventional methods is conveniently used, and any alumina prepared from, e.g., aluminum chloride, aluminum sulfate or aluminum alkoxide may be used. In general, alumina can be prepared by adding a suitable precipitant to an aluminum salt solution to form aluminum hydroxide, and thereafter, drying and calcining it.

The platinum group metal, one of the ingredients of the catalyst composition of this invention, is incorporated into the catalyst in an amount of about 0.01 to 6 percent by weight, preferably 0.01 to 3 percent by weight based on the total catalyst. The platinum group metal to be used in this invention includes not only light elements of the platinum group such as ruthenium, rhodium, palladium, etc. but also heavy metals of the platinum group such as osmium, iridium, platinum, etc. Use of platinum is especially preferred for practice of this invention.

Cadmium which is another ingredient of the catalyst composition of this invention is incorporated in an amount of about 0.01 to 6 percent by weight, preferably 0.1 to 4 percent by weight based on the total catalyst. Cadmium may be present on the carrier in either the metallic form or the form of a cadmium compound.

Tin which is still another ingredient of the catalyst composition of this invention is incorporated in an amount of about 0.01 to 6 percent by weight, preferably 0.1 to 4 percent by weight based on the total catalyst. It is supported on a carrier in the form of a tin compound or the metallic form.

These components, i.e., the platinum group metal, cadmium and tin or portions thereof, may be present in the form of complexes. In these components, the valency may be reduced to zero by a reduction treatment, but it is generally preferred that greater proportions of them be present in the form of a complex.

In the preparation of the catalyst of this invention, the above components of the platinum group metal, cadmium and tin may be deposited on a carrier by precipitation, coprecipitation, ion-exchange or the like. It is generally preferred to support these metal components on a carrier by impregnating the carrier with solutions of these metal components in the soluble form. The platinum group metal, cadmium and tin may be impregnated separately and successively, but any disadvantage is not brought about by conducting impregnation of these metals simultaneously.

In the catalyst preparation process of this invention, the platinum group metal is used in the form of an aqueous solution of a water-soluble compound. For instance, in the case of platinum, an aqueous solution of chloroplatinic acid, ammonium chloroplatinate or platinous chloride is used. Compounds of the other platinum group components may be used such as, for example, palladium chloride, rhodium chloride, etc. Organic solvents such as ethers and alcohols are also used for impregnation.

Cadmium compounds preferably used in the impregnation treatment include halides, sulfate, nitrate and organic acid salts. Cadmium may also be used in the form of organic salts.

As in the case of cadmium, tin is used in the form of halides, sulfate, nitrate, hydroxide, acetate or other organic salts. Use of halides of tin is especially preferred.

The form of the metal components used in the impregnation treatment is suitably chosen depending on whether water or an organic solvent is used, with use of halides generally preferred.

The activity of the catalyst of this invention is promoted by addition of a halogen or halide, especially chlorine. The halogen is incorporated in an amount of about 0.1 to 5 percent by weight, preferably about 0.4 to 3 percent by weight, based on the total catalyst. In the case of chlorine, especially good results are obtained by incorporating it in an amount of about 0.4 to 3 percent by weight. The halogen may be impregnated by any method. In general, it is preferred that the catalyst is contacted with a halogen-containing aqueous solution. When halides of the platinum group metal, cadmium and tin are used, halogens may be incorporated in situ in the catalyst while these metals are being deposited.

After incorporation of the solid carrier with the platinum group component, the cadmium component, the tin component and the halogen, the resultant composite is usually dried and calcined to obtain a finished catalyst.

The drying of the catalyst is conducted at a temperature exceeding about 80°C. in nitrogen or air. It is also possible to effect vacuum-drying at a temperature below about 80°C. The calcination can be accomplished by heating the dried catalyst at a temperature of about 400° to about 700°C.

In accordance with the hydrocarbon conversion process of this invention, a hydrocarbon feed oil is contacted with hydrogen in the presence of the above-mentioned catalyst. The conversion process of this invention can be utilized for such reactions as reforming, isomerization, hydrogenation, cyclization and the like. Reaction conditions such as temperature, pressure, space velocity, etc., are determined in context with the intended hydrocarbon conversion reaction. This invention is especially suitable for reforming processes. Light hydrocarbon oils, for instance, virgin naphtha fractions and cracked naphtha fraction, namely fractions boiling at about 20°C. to 300°C. are used as the feed oil. Use of a light hydrocarbon oil in which the amounts of sulfur and water present therein are reduced is preferred. In general, the sulfur content may be reduced by a hydrosulfurization process or the like. Dehydration of the feed oil may be accomplished according to conventional techniques, and adsorbents such as natural and synthetic zeolites may be used.

Conditions for the reforming of naphtha fractions are chosen and determined suitably depending on the composition of the starting naphtha, the quality of the intended product and other factors. The reforming is carried out at temperpatures ranging from about 300° to 600°C., preferably from about 350° to 550°C., under reaction pressures ranging from about 1 to 70 Kg/cm$^2$, preferably from about 5 to 50 Kg/cm$^2$, and at weight hourly space velocities ranging from about 0.1 to 10, preferably from 0.5 to 5. Hydrogen is supplied in an amount of from about 0.5 to about 20 moles per mole of the starting naphtha. Hydrogen may be mixed in advances with the starting naphtha, or it may be introduced into the reaction zone simultaneously with the starting hydrocarbon oil. Excessive hydrogen is separated from the reaction product after the reaction, and after it has been subjected to purification (including dehydration), it is recycled to the reaction zone and used for the reaction again.

The deactivated catalyst can be regenerated by contacting it with an oxygen-containing gas at a high temperature thereby burning carbonaceous substances deposited on the catalyst. It is also possible to effect activation of the deactivated catalyst by contacting it with a halogen-containing gas.

BRIEF DESCRIPTION OF THE DRAWING

The drawing is a graph comparing results of experiments made on the initial activity and the activity-maintenance of the catalyst of this invention with data obtained on comparison catalysts not a part of this invention.

PREFERRED EMBODIMENT

This invention will now be illustrated by reference to the following Examples.

EXAMPLE I

A catalyst of the platinum-cadmium-tin type was prepared by the following method:

Commercially available alumina* was calcined at 500°C. for 2 hours in an electric muffle furnace, and the so-calcined alumina was used as a carrier.

*alumina having a surface area of 180 m$^2$/g and extruded as 1.6 m/m in diameter.

4.8 g of chloroplatinic acid (H$_2$PtCl$_6$ .6H$_2$O) was dissolved in 3 liters of a 0.1-N solution of hydrochloric acid. This platinum-containing solution was impregnated on 600g of the above alumina carrier to support platinum uniformly on the carrier, followed by filtration and air-drying.

The above platinum catalyst was impregnated with a solution of 2.1 g of cadmium chloride (CdCl$_2$. 2,5H$_2$O) in 3 liters of water to support cadmium thereon. Then, the catalyst was filtered and air-dried again.

The above platinum-cadmium catalyst was impregnated with a solution of 5.2g of stannous chloride (SnCl$_2$. 2H$_2$O) in 3 liters of methanol to support the stannous component thereon. The catalyst was filtered, air-dried and calcined at 500°C. for 2 hours in an electric muffle furnace to obtain a finished catalyst (which will be referred to as "catalyst A" hereinbelow).

Platinum was supported on 600g of the same alumina carrier in the same manner as above. It was then filtered, air-dried and calcined at 500°C. for 2 hours in an electric muffle furnace to obtain a comparative platinum catalyst (which will be referred to as "catalyst B" hereinbelow).

4.8g of chloroplatinic acid (H$_2$[PtCl$_6$].6H$_2$O) was dissolved in 3 liters of a 0.1-N solution of hydrochloric acid. This platinum containing solution was impregnated into 600g of the above alumina carrier to support platinum uniformly thereon, followed by filtration and air-drying.

The above platinum-alumina catalyst was impregnated with a solution of 8.5g of cadmium chloride (CdCl$_2$.2.5H$_2$O) in 3 liters of water to support cadmium thereon. The catalyst (referred to as "catalyst C") was filtered, air-dried and calcined at 500°C. for 2 hours.

Commercially available alumina was calcined in a muffle furnace at 500°C. for 2 hours. 4.80g of chloroplatinic acid (H$_2$PtCl$_6$.6H$_2$O) was dissolved into 3 liters of 0.1-N solution of hydrochloric acid. 600g of the calcined gamma-alumina was impregnated in this solution for 48 hours. The resultant platinum-impregnated catalyst was dried at 80°–100°C. to platinum catalyst. 5.25g of stannous chloride (SnCl$_2$.2H$_2$O) was dissolved into 3 liters of methanol, in which the platinum catalyst was impregnated for 48 hours under nitrogen atmosphere. The resultant platinum-tin-impregnated catalyst was then filtered and washed with methanol. After drying, this catalyst (referred to as "catalyst D") was calcined in a muffle furnace at 500°C. for 2 hours.

EXAMPLE II

Reforming of Naphtha Fraction

With use of above catalysts A – D, (see Table 1 given below), a virgin naphtha fraction (boiling point range = about 90° to about 175°C. : sulfur content = 0%) derived from Middle East crude oil was reacted under conditions specified below.

Experimental Reaction Conditions:
Hydrogen pressure: 10 Kg/cm$^2$
H$_2$/hydrocarbon molar ratio : 8.0
Space velocity: 1.5 W/H/W The drawing illustrates the reaction temperature (average temperature of the catalyst bed) required for obtaining a reaction product of a research octane number of 101.5 as a function of the run length (days) with respect to each of catalysts A–D. The data are displayed in Table 2 given below.

When catalysts A–D were compared with respect to the initial activity and the activity-maintenance in the above reaction, it was found that catalyst A and D were prominently effective over catalysts B and C, demonstrating the enhanced results in the presence of tin.

Table 1

| | Catalyst Composition | | | |
| | Amounts Supported on Carrier (% by weight) | | | |
| | Pt | Cd | Sn | Cl |
| Catalyst A | 0.32 | 0.09 | 0.36 | 0.96 |
| Catalyst B | 0.32 | — | — | 0.79 |
| Catalyst C | 0.32 | 0.35 | — | 1.12 |
| Catalyst D | 0.32 | — | 0.46 | 1.00 |

Table 2

| | Experimental Results | | | |
|---|---|---|---|---|
| | Catalyst A | Catalyst B | Catalyst C | Catalyst D |
| Initial Temperature (°C.) (average temperature of catalyst bed) | 489 | 505 | 495 | 488 |
| Temp.-Increasing Rate (°C./day) | 3.8 | 6.3 | 4.9 | 3.5 |

What is claimed is:

1. A process for the catalytic reforming of a naphtha fraction, which comprises contacting said naphtha fraction in the presence of hydrogen at a temperature of about 300° to 600°C. under a pressure of about 1 to 70 Kg/cm$^2$ with a catalyst composition comprising a refractory oxide as a carrier, and about 0.01 to 6 percent by weight of a metal of the platinum group, about 0.01 to 6 percent by weight of cadmium, about 0.01 to 6 percent by weight of tin and about 0.1 to 5 percent by weight of a halogen, based on the catalyst.

2. The process of claim 1 wherein the hydrogen is present in an amount ranging between about 0.5 and 20 moles per mole of naphtha.

3. The process of claim 1 wherein the catalyst becomes deactivated and is thereafter reactivated by contacting same with a halogen-containing gas.

* * * * *